United States Patent
Oishi et al.

(10) Patent No.: US 10,026,026 B2
(45) Date of Patent: Jul. 17, 2018

(54) PRINTER, PRINTING SYSTEM AND PRINT CONTROL METHOD

(71) Applicant: STAR MICRONICS CO., LTD., Shizuoka (JP)

(72) Inventors: Shota Oishi, Shizuoka (JP); Shinichiro Suzuki, Shizuoka (JP); Koji Miura, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 0 days.

(21) Appl. No.: 15/425,019

(22) Filed: Feb. 6, 2017

(65) Prior Publication Data

US 2017/0147911 A1    May 25, 2017

Related U.S. Application Data

(63) Continuation of application No. PCT/JP2015/054990, filed on Feb. 23, 2015.

(30) Foreign Application Priority Data

Aug. 22, 2014  (JP) ................................ 2014-169017

(51) Int. Cl.
*G06K 15/02* (2006.01)
*H04N 1/00* (2006.01)
*B41J 5/30* (2006.01)

(52) U.S. Cl.
CPC ............ *G06K 15/1802* (2013.01); *B41J 5/30* (2013.01); *G06K 15/181* (2013.01); *H04N 1/00233* (2013.01)

(58) Field of Classification Search
None
See application file for complete search history.

(56) References Cited

U.S. PATENT DOCUMENTS

| 5,506,940 A | 4/1996 | Bamford et al. |
| 5,634,134 A * | 5/1997 | Kumai ................ B41J 3/46 |
| | | 704/8 |

(Continued)

FOREIGN PATENT DOCUMENTS

| JP | H07093310 | 4/1995 |
| JP | H08202693 | 8/1996 |

(Continued)

OTHER PUBLICATIONS

EPO, Supplementary European Search Report of EP 15833908.5 dated Jan. 31, 2018.

(Continued)

*Primary Examiner* — Helen Zong
(74) *Attorney, Agent, or Firm* — Lex IP Meister, PLLC

(57) ABSTRACT

The present invention enables successful printing whether printing data contains a character code of either code page or Unicode without an addition of an apparatus for code conversion and without expansion of printer memory for storing Unicode font set. Upon receipt of the input of printing data containing the character code of the code page, a first print control unit is selected to control printing of a string represented by the code page with a font available for the code page. Upon receipt of the input of printing data containing the character code of Unicode, a second print control unit is selected to convert the character code of Unicode to the character code of the code page and to control printing of a string represented by the Unicode with a font available for the code page on the basis of the code page after conversion.

17 Claims, 13 Drawing Sheets

(56) References Cited

U.S. PATENT DOCUMENTS

| | | |
|---|---|---|
| 2001/0005207 A1 | 6/2001 | Muikaichi et al. |
| 2003/0055806 A1 | 5/2003 | Wong et al. |
| 2005/0200913 A1 | 9/2005 | Hohensee et al. |
| 2008/0276316 A1 | 11/2008 | Roelker et al. |
| 2009/0207305 A1* | 8/2009 | Fujita ............... H04N 7/163 348/468 |
| 2010/0328694 A1 | 12/2010 | Horiuchi et al. |
| 2012/0030375 A1 | 2/2012 | Schulenburg |
| 2013/0033720 A1* | 2/2013 | Hirayama ........... G06F 3/1206 358/1.14 |
| 2015/0002889 A1* | 1/2015 | Takamoto ........... G06F 3/1237 358/1.15 |
| 2015/0036182 A1* | 2/2015 | Nakamura ........... G06F 3/1207 358/1.15 |

FOREIGN PATENT DOCUMENTS

| | | |
|---|---|---|
| JP | H09188006 | 7/1997 |
| JP | 10-278364 | 10/1998 |
| JP | 2001205870 | 7/2001 |
| JP | 2001255867 | 9/2001 |
| JP | 2002002032 | 1/2002 |
| JP | 2002-091419 | 3/2002 |
| JP | 2003177915 | 6/2003 |
| JP | 2004246619 | 9/2004 |
| JP | 2004-330688 | 11/2004 |
| JP | 2006221336 | 8/2006 |
| JP | 2007-076253 | 3/2007 |
| JP | 2007527810 | 10/2007 |
| JP | 2008509458 | 3/2008 |
| JP | 2008251033 | 10/2008 |
| JP | 2013-210885 | 10/2013 |
| JP | 2014054846 | 3/2014 |
| JP | 2014109851 | 6/2014 |

OTHER PUBLICATIONS

JPO, Office Action, Application No. of 2014-169017, Jan. 23, 2018.

* cited by examiner

FIG. 7

| Letter | Unicode | JIS |
|---|---|---|
| ぁ | 3041 | 2421 |
| あ | 3042 | 2422 |
| ぃ | 3043 | 2423 |
| い | 3044 | 2424 |
| ぅ | 3045 | 2425 |
| う | 3046 | 2426 |
| ぇ | 3047 | 2427 |
| え | 3048 | 2428 |
| ぉ | 3049 | 2429 |
| お | 304A | 242A |
| ⋮ | ⋮ | ⋮ |

PRINTER, PRINTING SYSTEM AND PRINT CONTROL METHOD

CROSS-REFERENCE TO RELATED APPLICATION

This application is a continuation of International Patent Application No. PCT/JP2015/054990, filed on Feb. 23, 2015, which claimed priority of Japanese Patent Application No. 2014-169017 filed on Aug. 22, 2014. The contents of these applications are incorporated herein by reference in their entirety.

BACKGROUND (a) Field

The present invention relates to a printer, a printing system, and a print control method, particularly being useful in a printer and a printing system capable of receiving an input of printing data containing a character code of a character from a host computer to execute printing of a string on the basis of the input character code.

(b) Description of the Related Art

A printing system comprising a printer connected to a host computer is well known wherein the printer executes printing upon receipt of printing data of a document and others produced by the host computer. Printing is executed on the basis of a character code of a character and a font designated by the host computer.

Trends toward the globalization of industry have had more computers capable of handling a mix of characters of a plurality of languages. A smart phone, a tablet, and other mobiles have been used worldwide without limitation of a country. Most of such computers and mobiles have been using Unicode, a computing industry standard for the consistent representation of text. Unicode has been the major standard especially for mobiles. Unicode contains more than million code points covering worldwide languages.

Most conventional printers, however, have been using a code page, a standard specific to a particular country or region. Such printers does not have a font set covering the entire set of code points of Unicode. Any document produced by the host computer using Unicode possibly contains a character code or a font beyond the coverage of the printer, resulting in generation of garbled characters in a printed document.

A solution has been proposed in Japanese Patent Application Publication No. 2013-210885 ([0073] and FIG. 11) where a print control apparatus is provided between the host computer and the printer to convert a universal character code such as Unicode sent from the host computer into a specific character code for the printer (a character code covering font data installed in the printer). A print instruction comprises a "character code switching command" followed by a specific character code. The character code switching command switches the character codes according to language attributes.

Another solution has been proposed in Japanese Patent Application Publication No. 2002-91419 where a printer is provided with a plurality of font sets covering JIS code, Unicode, or Windows (registered trademark) compatible Glyph-Width for every character code so that a desired font set is selectable according to printing environment. The character codes are switchable by selecting a font set via a command, allowing easy printing with JIS code, Unicode, or Glyph-Width only by programming the printer driver.

SUMMARY

Technology in Japanese Patent Application Publication No. 2013-210885, however requires the print control apparatus to be provided between the host computer and the printer, undesirably increasing the cost of the entire system.

Technology in Japanese Patent Application Publication No. 2002-91419 eliminates the need of an additional apparatus, but requires a plurality of font sets to be previously stored. For example, the printer needs to have a Unicode font set in addition to a JIS code font set to deal with both Unicode and the code page.

Unicode contains more than million code points covering worldwide languages. The amount of code points would be further increased with the addition of a variant character selector for identifying a variant character different from a standard character in appearance, requiring expanded memory size to store such huge amount of code points. Especially, a POS printer connected to a point of sale system generally has a memory of smaller size enough to print a receipt. A font set of larger scale such as a Unicode font would be hardly stored.

The present invention is achieved to solve the above problems, enabling successful printing whether printing data contains a character code of a code page or of Unicode without an addition of an apparatus and without expansion of printer memory.

In the present invention, one of a first print control unit or a second print control unit is selected by the printer according to a character code included in an input of printing data from the host computer. When the input of printing data contains a character code of a specific code page, the first print control unit is selected to print the character represented by the code page by using a font available for the code page. When the input of printing data contains a character code of Unicode, the second print control unit is selected to print the character represented by Unicode by using the font available for the code page.

Accordingly, the printer receives the input of printing data as it is from the host computer and executes printing by using a code page font via internal processing whether the printing data contains a character code of either a specific code page or Unicode. There is no need to provide a print control apparatus between the host computer and the printer to convert a character code of Unicode to a character code of the code page. There is no need to previously store a font set in the printer for the entire set of character codes of Unicode. The invention enables successful printing whether the printing data contains a character code of either a specific code page or Unicode without an addition of an apparatus and without expansion of printer memory.

BRIEF DESCRIPTION OF THE DRAWINGS

FIG. 7 is a code conversion table from Unicode to JIS code.

DETAILED DESCRIPTION

Figure 1:
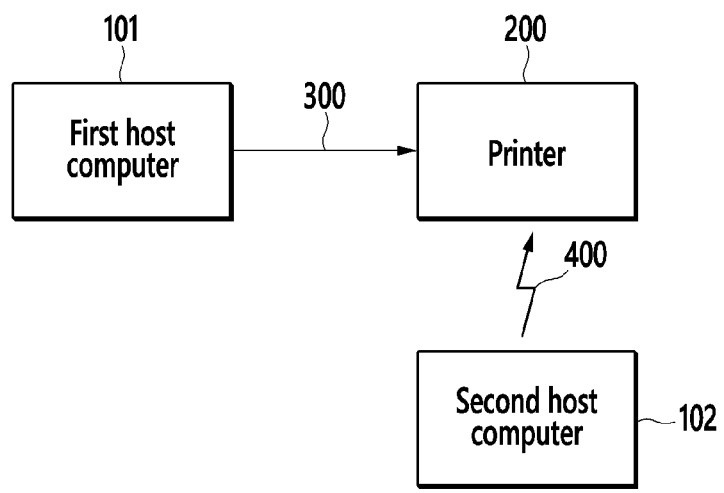
FIG. 1 is a block diagram of a printing system of an embodiment.

An embodiment of the present invention is being described referring to the drawings. FIG. 1 is a block diagram of a printing system comprising a first host computer 101, a second host computer 102, and a printer 200 receiving printing data from the host computers 101 and 102 to execute printing.

The first host computer 101 may be a desktop POS (Point of Sale) terminal connected to the printer 200 via a USB (Universal Serial Bus) cable. The second host computer 102 may be a portable POS terminal (smart phone, tablet, etc.) connected to the printer 200 via a wireless network 400 such as wireless LAN and Bluetooth. The first host computer 101 may be connected to the printer 200 via wired or wireless LAN.

The first host computer 101 is installed with an application not using Unicode. Printing data containing a character code of a specific code page is generated by the application. The second host computer 102 is installed with another application using Unicode. Printing data containing a character code of Unicode is generated by the application.

Either of the first host computer 101 and the second host computer 102 may be installed with both of the applications to generate printing data containing a character code of either of the code page and Unicode as the case may be.

The code page includes, for example in Japan, JIS, Shift JIS, EUC (Extended Unix Code), and ISO-2022-JP. Unicode includes UTF-8, UTF-16, and UTF-32. The user of the first host computer 101 has an option to select one of the code pages to generate printing data by using the application. The user of the second host computer 102 has an option to select one of the Unicode encodings to generate printing data by using the application.

Generally, it is not common for the user to change the code page once selected for the application. Most users do not even change the default code page. Then, the default code page initially set for the application is mostly relied to generate printing data in the first host computer 101.

Similarly, the default Unicode initially set for the application is mostly relied to generate printing data in the second host computer 102.

The printer 200 may be a POS printer connected to the POS terminal to print a receipt and others. The printer 200 stores data of font set ("font data") of the code page, but not font data for the entire set of character codes of Unicode.

Figure 2:
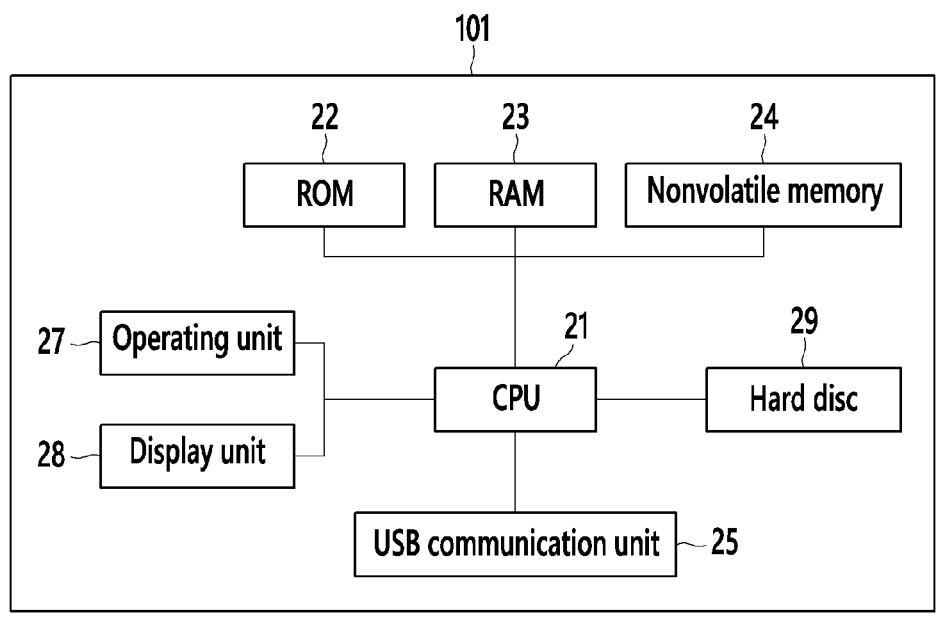
FIG. 2 is a block diagram of the hardware configuration of a first host computer.
Figure 3:
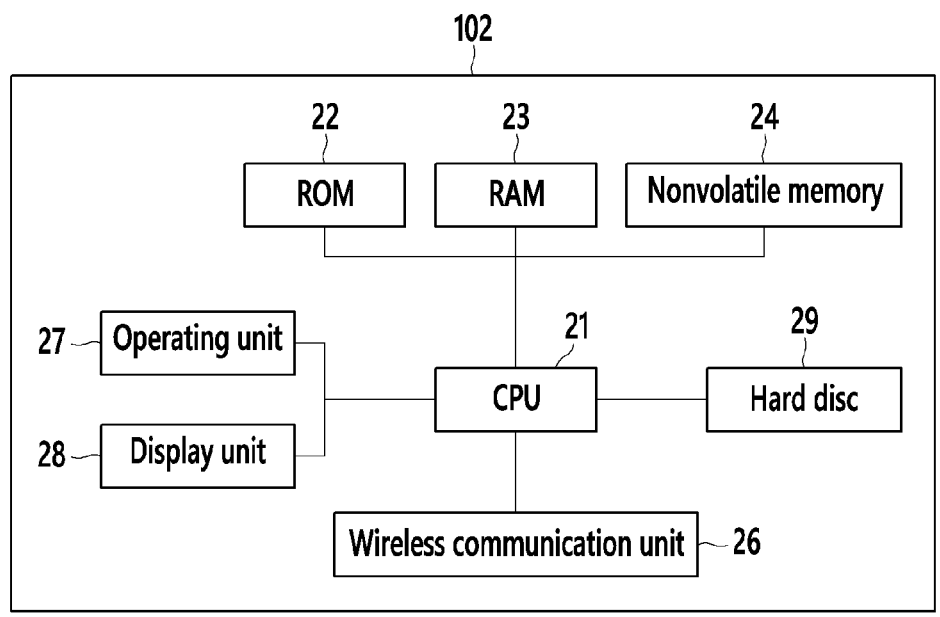
FIG. 3 is a block diagram of the hardware configuration of a second host computer.

FIG. 2 is a block diagram of the hardware configuration of the first host computer 101. FIG. 3 is a block diagram of the hardware configuration of the second host computer 102. The first host computer 101 comprises a CPU 21, a ROM 22, a RAM 23, a nonvolatile memory 24 such as a flash memory, a USB communication unit 25, an operating unit 27, a display unit 28, and a hard disc 29. The second host computer 102 comprises a similar configuration but a wireless communication unit 26 instead of the USB communication unit 25.

The CPU 21 controls the operation of the host computer 101 or 102 by using the RAM 23 as a work memory in accordance with a program stored in the ROM 22, the nonvolatile memory 24, or the hard disc 29. The USB communication unit 25 communicates with the printer 200 via the USB cable 300, for example, to transmit printing data generated by the first host computer 101 to the printer 200.

The wireless communication unit 26 communicates with the printer 200 via the wireless network 400, for example, to transmit printing data generated by the second host computer 102 to the printer 200. The operating unit 27 comprises a keyboard, a mouse, and a touch panel operated by the user to give an instruction of printing and others. The display unit 28 comprises a liquid crystal display for displaying a document and others. The hard disc 29 stores various programs and data including printing data and font data.

Figure 4:
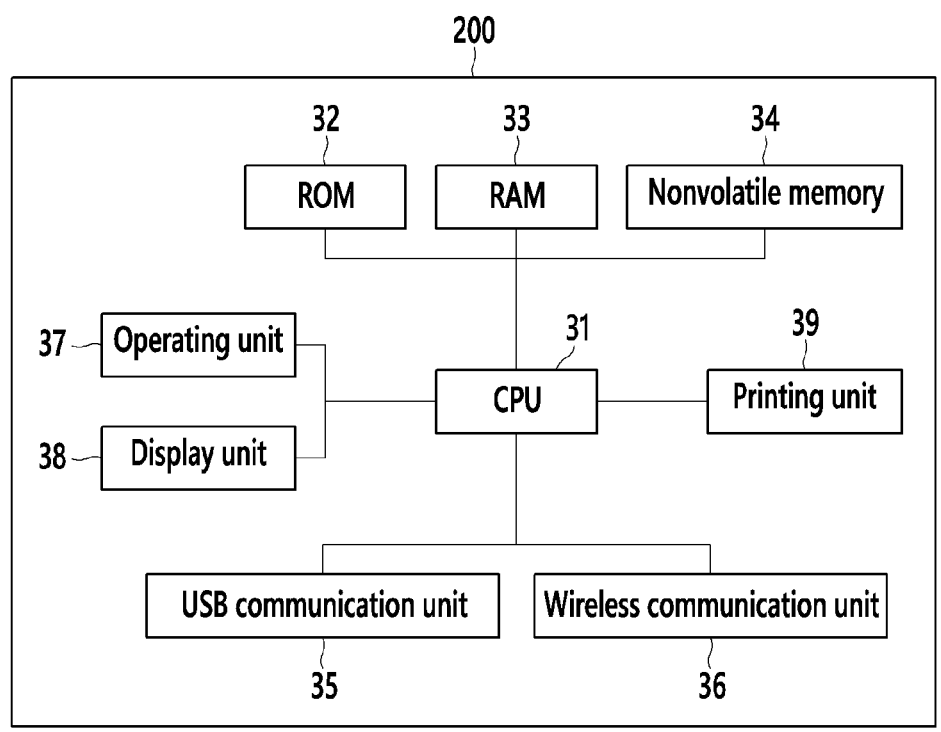
FIG. 4 is a block diagram of the hardware configuration of a printer.

FIG. 4 is a block diagram of the hardware configuration of the printer 200. The printer 200 comprises a CPU 31, a ROM 32, a RAM 33, a nonvolatile memory 34 such as a flash memory, a USB communication unit 35, a wireless communication unit 36, an operating unit 37, a display unit 38, and a printing unit 39.

The CPU 31 controls operation of the printer 200 by using the RAM 33 as a work memory in accordance with a program stored in the ROM 32 and the nonvolatile memory 34. The printer 200 has a code page mode in which a character represented by a code page is printed with a font available for the code page and a Unicode mode in which a character represented by Unicode is printed with the font available for the code page. The CPU 31 controls operation of the printer 200 in either mode according to character code setting information stored in the RAM 33. The character code setting information designates which code page or which Unicode is to be relied, specifically one of JIS, Shift JIS, EUC, ISO-2022-JP, and others in the case of a code page and one of UTF-8, UTF-16, UTF-32, and others in the case of Unicode.

The nonvolatile memory 34 stores default character code information initially set when the printer 200 is powered on. The default character code information is stored in the RAM 33 as the character code setting information and the code page mode is thereby initially selected. The character code setting information in the RAM 33 is updated to allow any mode to be selected in printing on the basis of printing data.

The USB communication unit 35 communicates with the first host computer 101 via the USB cable 300, for example, to receive printing data generated by the first host computer 101. The wireless communication unit 36 communicates with the second host computer 102 via the wireless network 400, for example to receive printing data generated by the second host computer 102.

The operating unit 37 comprises a button, a touch panel and others operated by the user to give an instruction of mode selection and others. The display unit 38 comprises a liquid crystal display for displaying the status of the printer 200 and others. The printing unit 39 executes printing on the basis of printing data upon receipt of an instruction from the CPU 31. The printing unit 39 executes printing of a string represented by the character code on the basis of the input character code from the host computer 101 or 102.

Figure 5:
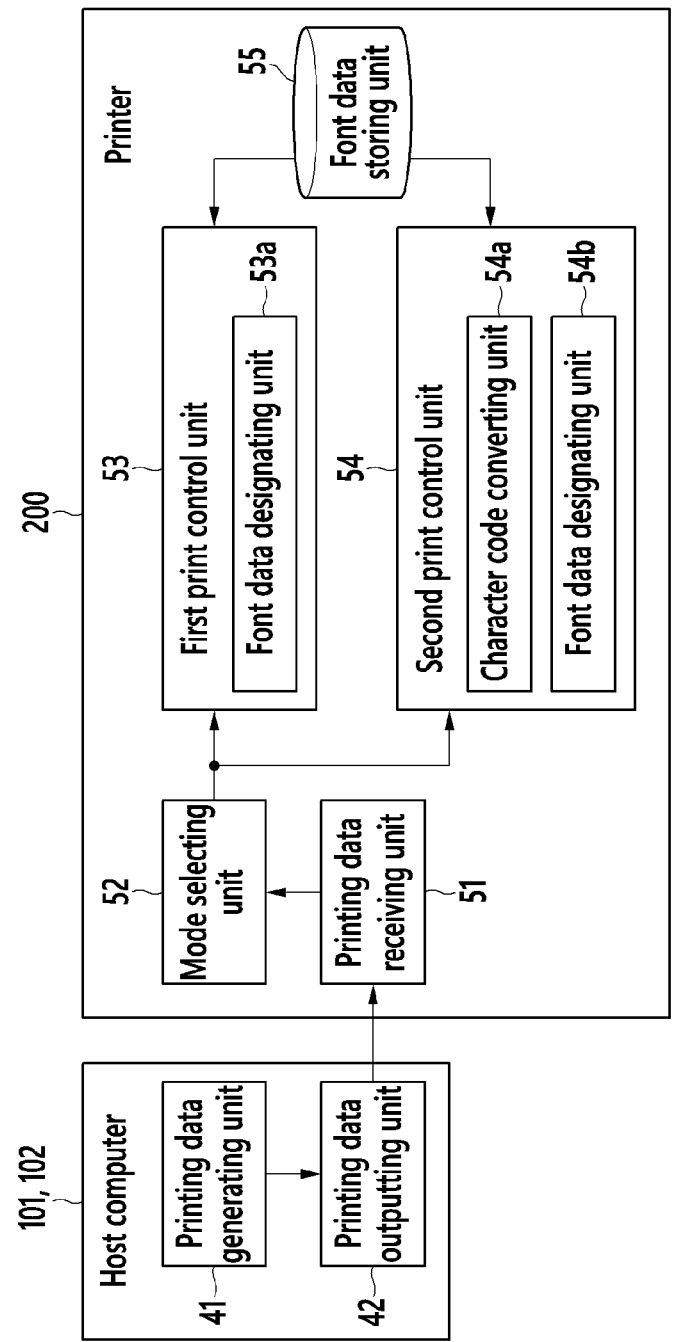
FIG. 5 is a block diagram of the functional configuration of the host computer and the printer.

FIG. 5 is a block diagram of the functional configuration of the host computer 101 or 102 and the printer 200. Either of the host computers 101 and 102 comprises a printing data generating unit 41 and a printing data outputting unit 42. The printer 200 comprises a printing data receiving unit 51, a mode selecting unit 52, a first print control unit 53, a second print control unit 54, and a font data storing unit 55.

The function of the printing data generating unit 41 and the printing data outputting unit 42 is achieved by the CPU 21 in accordance with the program stored in the ROM 22, the nonvolatile memory 24, or the hard disc 29. The function of the printing data receiving unit 51, the mode selecting unit 52, the first print control unit 53, and the second print control unit 54 is achieved by the CPU 31 in accordance with the program stored in the ROM 32 or the nonvolatile memory 34. The font data storing unit 55 includes the ROM 32, the nonvolatile memory 34, and another storage medium such as a hard disc.

The printing data generating unit 41 generates printing data containing any string by an operation of the user via the operating unit 27. In the first host computer 101, the printing data generating unit 41 generates printing data of the string represented by the character code of the code page. In the second host computer 102, the printing data generating unit 41 generates printing data of the string represented by the character code of Unicode. The printing data contains font designation information to specify a font to print the string. Font can be designated on a character by character basis.

The printing data outputting unit 42 outputs the generated printing data to the printer 200. In the first host computer 101, the printing data outputting unit 42 outputs the printing data containing the character code of the code page. In the second host computer 102, the printing data outputting unit 42 outputs the printing data containing the character code of Unicode. Either printing data does not have any additional dedicated information to be referred by the mode selecting unit 52 to select one of the first control unit 53 and the second control unit 54.

The printing data receiving unit 51 of the printer 200 receives an input of printing data from the host computer 101 or 102. The printing data receiving unit 51 receives an input of printing data containing a character code of the code page from the first host computer 101. The printing data receiving unit 51 receives an input of printing data containing a character code of Unicode from the second host computer 102.

The mode selecting unit 52 selects one of the first control unit 53 and the second control unit 54 according to the character code of printing data received by the printing data receiving unit 51. The first control unit 53 is selected when the character code of the code page is received. The second control unit 54 is selected when the character code of the Unicode is received.

The function of the mode selecting unit 52 enables the selection of the code page mode and the Unicode mode. Specifically, the mode selecting unit 52 selects one of the first control unit 53 and the second control unit 54 according to the character code stored in the RAM 33 as the character code setting information.

Figure 6:
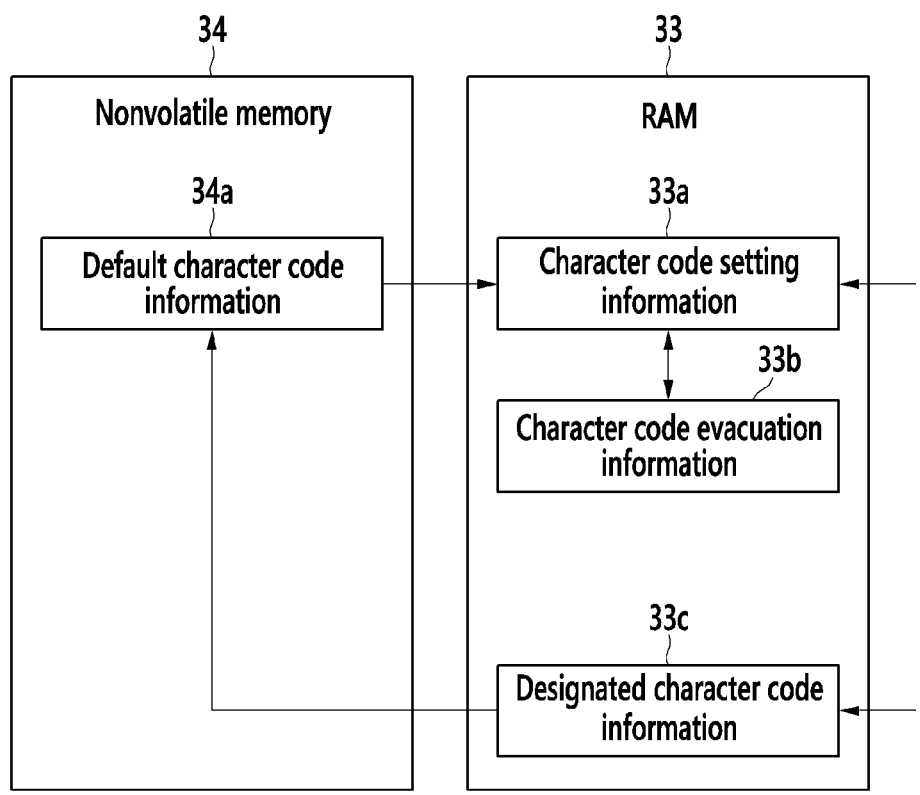
FIG. 6 is a block diagram of stored information in a RAM and a nonvolatile memory.

FIG. 6 is a block diagram of stored information in the RAM 33 and the nonvolatile memory 34. The nonvolatile memory 34 stores default character code information 34a initially set when the printer 200 is powered on. The default character code information 34a can be changed by the user, for example, via the operating unit 37.

Specifically, when a character code (of any code page) is designated via the operating unit 37, designated code information 33c representing the designated character code is firstly stored in the RAM 33 and then stored in the nonvolatile memory 34 as the default character code information 34a. Without any designation by the user, the default character code information 34a representing a predetermined code page is stored in the nonvolatile memory 34.

When the printer 200 is powered on, the default character code information 34a stored in the nonvolatile memory 34 is set in the RAM 33 as character code setting information 33a by the mode selecting unit 52. The code page mode is initially enabled and accordingly the first print control unit 53 is initially selected.

When the printing data receiving unit 51 receives printing data containing a character code different from the character code stored in the RAM 33, the mode selecting unit 52 updates the character code setting information 33a in the RAM 33. The mode selecting unit 52 switches the modes according to the character code of the received printing data.

Upon receipt of printing data containing a character code of Unicode while the character code of a specific code page is stored in the RAM 33, the character code setting information 33a is updated. The code page mode is switched to the Unicode mode and thereby the second print control unit 54 is operated instead of the first print control unit 53.

Upon receipt of printing data containing a character code of another code page, the character code setting information 33a is updated. The code page mode is, however, maintained and thereby the first print control unit 53 continues to be operated.

In the first embodiment, the mode selecting unit 52 examines a predetermined amount of received data from the beginning of the input of printing data to determine whether the character code is a code page or Unicode and thereby select one of the first print control unit 53 and the second print control unit 54. Examining only a predetermined amount of data is enough for determination due to a unique format to Unicode.

The character code setting information 33a is evacuated as character code evacuation information 33b by the mode selecting unit 52 upon receipt of printing data. The character code evacuation information 33b is restored as the character code setting information 33a by the mode selecting unit 52 upon completion of printing, thereby restoring the original setting of the character code.

Code page printing is executed by the application installed in the first host computer 101 and then Unicode printing is executed by the application installed in the second host computer 102, in which case the character code setting information 33a is reset to the original code page setting upon completion of Unicode printing, eliminating the need of updating the character code setting information 33a when code page printing is again executed by the application installed in the first host computer 101.

Evacuation of the character code setting information 33a by the mode selecting unit 52 may be effected only when the first print control unit 53 is switched to the second print control unit 54. The character code evacuation information 33b may be restored when the second print control unit 54 is switched to the first print control unit 53, thereby restoring the original setting of the code page.

Upon receipt of printing data containing a character code of a code page by the printing data receiving unit 51, the first print control unit 53 enables printing of the character represented by the code page by using the code page font. The first print control unit 53 comprises a font data designating unit 53*a*.

The font data designating unit 53*a* reads out such font data as designated by font designation information contained in the printing data from among various font data stored in the font data storing unit 55. The first print control unit 53 executes printing on the basis of the character code representing each character by using the font data read out from the font data storing unit 55.

Upon receipt of printing data containing a character code of Unicode by the printing data receiving unit 51, the second print control unit 54 enables printing of the character represented by Unicode by using the code page font. The second print control unit 54 comprises a character code converting unit 54*a* and a font data designating unit 54*b*.

The character code converting unit 54*a* converts a character code of Unicode into a character code of a predetermined code page. Conversion is executed in accordance with a code conversion table such as FIG. 7 where the predetermined code page is the JIS code.

A particular character code of Unicode does not possibly exist in the code page. In that case, a character code of a box or other substitute characters such as "•" may be set in the table to represent that there is no correspondence in the JIS code.

The font data designating unit 54*b* designates such font data as available for the code page (JIS code) after conversion by the character code converting unit 54*a*. The font data designating unit 54*b* reads out such font data as designated by font designation information contained in the printing data and as available for the code page (JIS code) after conversion from among various font data stored in the font data storing unit 55.

The second print control unit 54 executes printing of a string of Unicode received by the printing data receiving unit 51 on the basis of the character code of each character of the code page after conversion. The second print control unit 54 enables printing of the string with a font available for the code page after conversion by using the font data read out from the font data storing unit 55.

Figure 8:
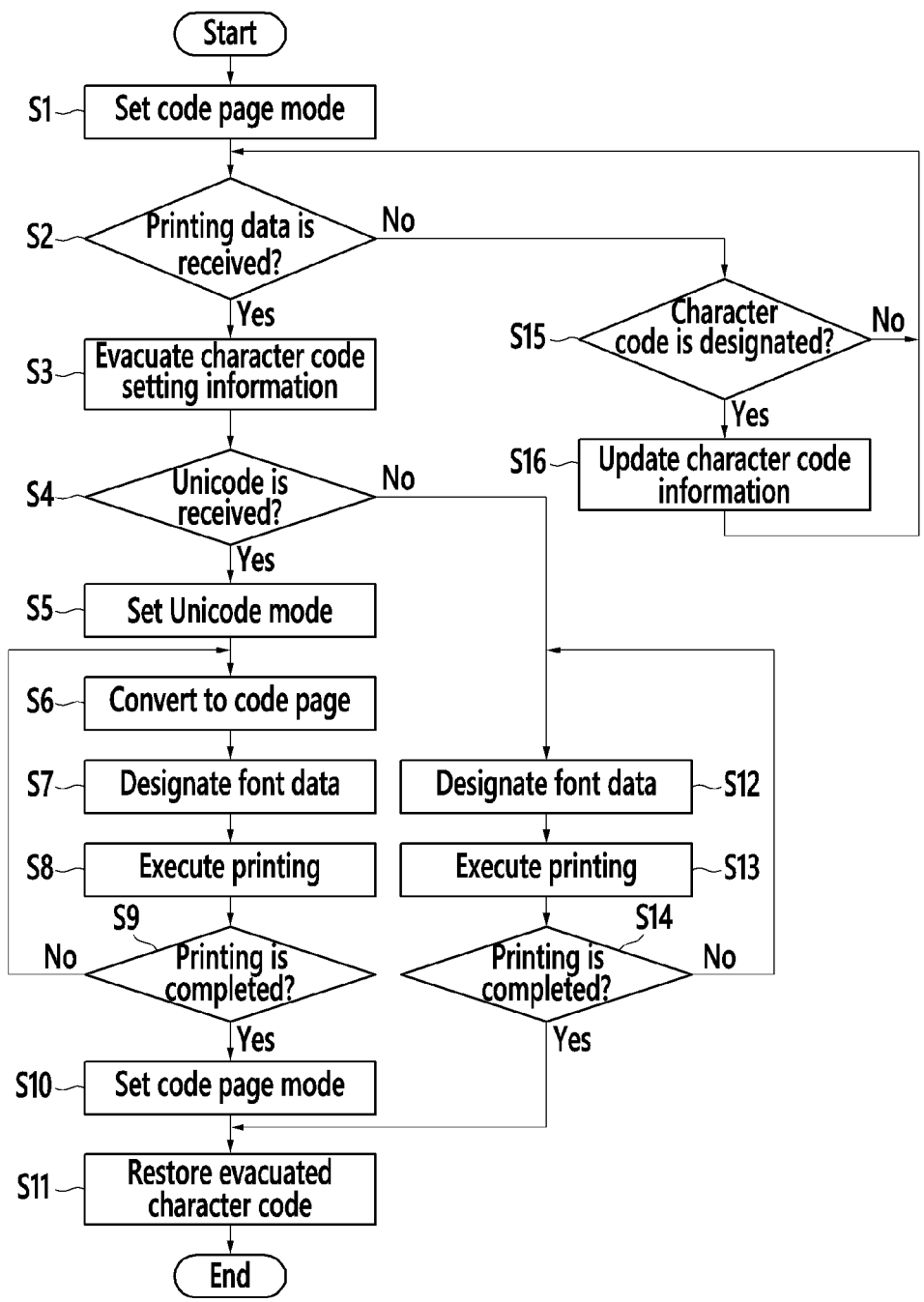
FIG. 8 is a flow chart of the operation of the printer in the first embodiment.

FIG. 8 is a flow chart of the operation of the printer 200 in the first embodiment. The flow chart starts when the printer 200 is powered on.

The mode selecting unit 52 sets the default character code information 34*a* stored in the nonvolatile memory 34 as the character code setting information 33*a* in the RAM 33 and initially sets the code page mode according to the character code corresponding to the character code setting information 33*a* in the RAM 33 (Step S1).

The printing data receiving unit 51 determines whether printing data has been input from the host computer 101 or 102 (Step S2). Upon receipt of printing data, the mode selecting unit 52 evacuates the character code setting information 33*a* stored in the RAM 33 into the character code evacuation information 33*b* and then sets the character code of received printing data as the character code setting information 33*a* (Step S3).

The mode selecting unit 52 examines a predetermined amount of received data from the beginning of the input of printing data to determine which printing data has been received, specifically, printing data containing a character code of the code page or of Unicode (Step S4). In the case of Unicode, the mode selecting unit 52 sets the Unicode mode and selects the second print control unit 54 (Step S5). The character code setting information 33*a* stored in the RAM 33 is updated to the character code of Unicode (UTF-8, UTF-16, UTF-32, etc.) from the character code of the code page initially selected (JIS, Shift Jis, EUC, ISO-2022-JP, etc.)

The second print control unit 54 activates the character code converting unit 54*a* to sequentially convert each character code of Unicode of each character constituting the printing data into a character code of the code page (Step S6). The second print control unit 54 further activates the font data designating unit 54*b* to read out such font data as designated by font designation information contained in the printing data and as available for the code page after conversion (Step S7). The second print control unit 54 executes printing of the string on the basis of the character code of each character of the code page after conversion with the font available for the character code after conversion (Step S8).

The second print control unit 54 determines whether printing is completed (Step S9). When printing is not completed, Step S6 is resumed. Unless printing is completed, S6 to S9 are repeated. When printing is completed, the mode selecting unit 52 sets the code page mode and selects the first print control unit 53 (Step S10). The mode selecting unit 52 restores the character code evacuation information 33*b* to be set again as the character code setting information 33*a* (Step S11). The FIG. 8 flow chart ends.

When the received printing data is determined to contain a character code of the code page in Step S4, the initially selected first print control unit 53 activates the font data designating unit 53*a* to designate such font data as designated by font designation information contained in the printing data (Step S12). The first print control unit 53 executes printing of the string on the basis of the character code of each character constituting the printing data by using the designated font data (Step S13).

The first print control unit 53 determines whether printing is completed (Step S14). When printing is not completed, Step S12 is resumed. Unless printing is completed, S12 to S14 are repeated. When printing is completed, the mode selecting unit 52 restores the character code evacuation information 33*b* to be set again as the character code setting information 33*a* (Step S11). The FIG. 8 flow chart ends.

When there has been no input of printing data in Step S2, the CPU 31 determines whether any operation has been done to set a desired character code in the nonvolatile memory 34 as the default character code information 34*a* (Step S15). When there has been no operation, Step S2 is resumed. When there has been an operation, a character code as designated is set in the nonvolatile memory 34 as the default character code information 34*a* (Step S16) and then the Step S2 is resumed.

In the first embodiment, as described above, one of the first print control unit 53 and the second print control unit 54 is selected according to the character code of printing data received by the printer 200 from either of the host computers 101 and 102. Upon receipt of printing data containing the character code of the code page, the first print control unit 53 is selected to print the string represented by the code page with the code page font. Upon receipt of printing data containing the character code of Unicode, the second print control unit 54 is selected to print the string represented by Unicode with the code page font on the basis of the character code of the code page after conversion.

Accordingly, the printer 200 receives printing data as it is from either of the host computers 101 and 102 and executes printing by using a code page font via internal processing whether the printing data contains a character code of a specific code page or of Unicode. There is no need to provide a print control apparatus between the host computer and the printer to convert a character code of Unicode to a character code of the code page. There is no need to previously store a font set in the printer for the entire set of character codes of Unicode. The invention enables successful printing whether the printing data contains a character code of a specific code page or of Unicode without an addition of an apparatus and without expansion of printer memory.

(Second Embodiment)

The second embodiment of the invention is being described referring to the drawings. The entire configuration of the print system, the hardware configuration of either of the host computer 101 and the host computer 102, and the hardware configuration of the printer 200 are the same as those shown in FIG. 1 to FIG. 4.

Figure 9:
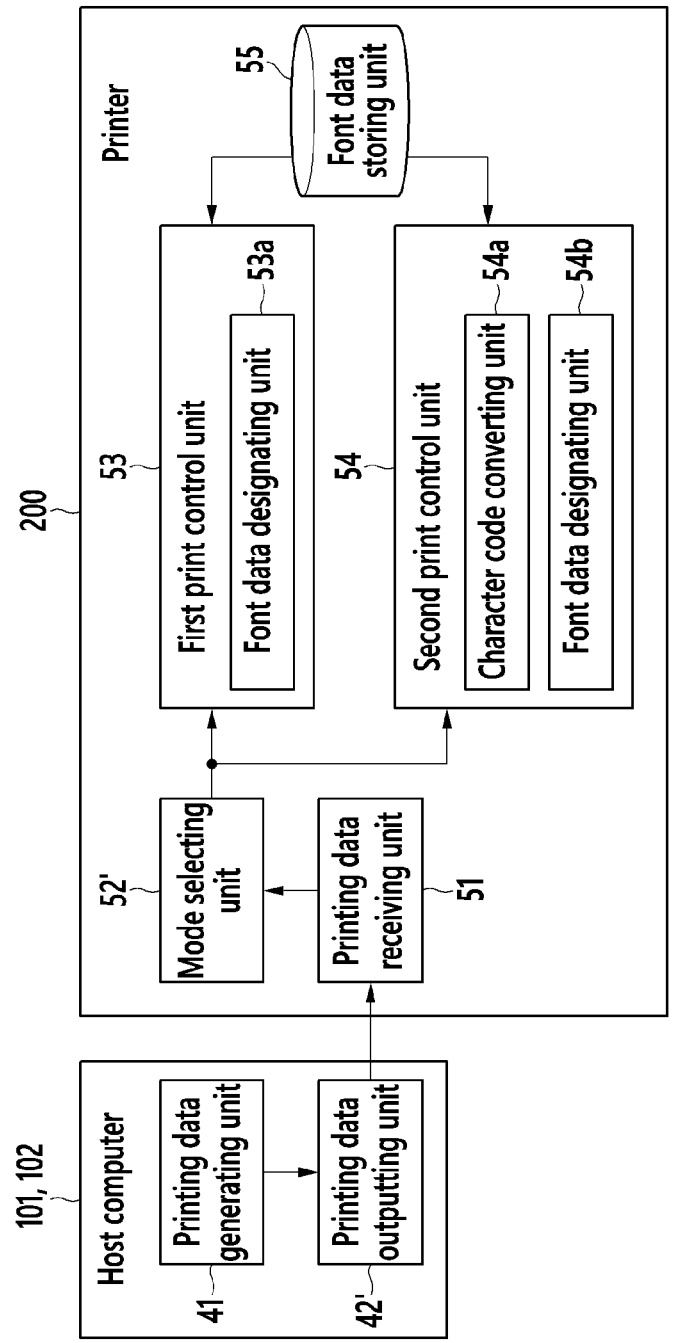
FIG. 9 is a block diagram of the functional configuration of the host computer and the printer of the second embodiment.

FIG. 9 is a block diagram of the functional configuration of the host computer 101 or 102 and the printer 200 of the second embodiment. Any element having the same symbol as FIG. 5 features the same function, the explanation of which is being omitted. The printing data outputting unit 42 of the host computer 101 or 102 is replaced by a printing data outputting unit 42'. The mode selecting unit 52 of the printer 200 is replaced by a mode selecting unit 52'.

The printing data outputting unit 42' adds a character code switching command to the beginning of printing data containing a character code of Unicode. The function of the printing data outputting unit 42' is executed by the printer driver installed in the host computer 101 or 102.

Figure 10:
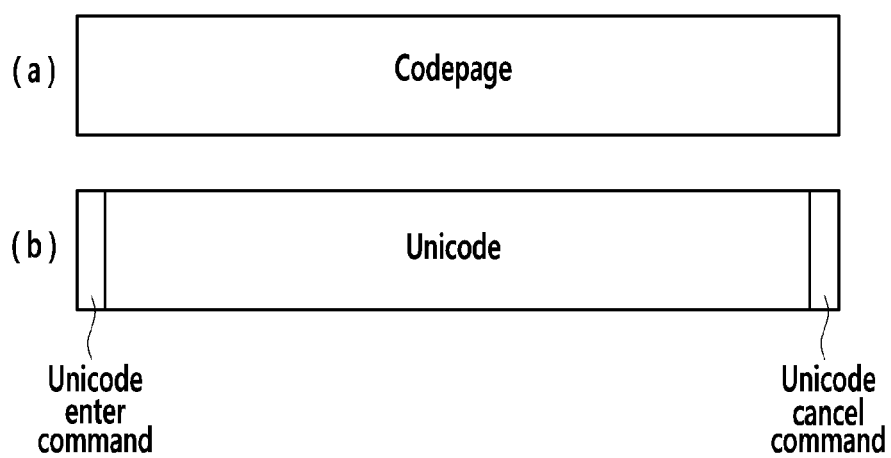
FIG. 10 is a format example of printing data output by the printing data outputting unit.

FIG. 10 is a format example of printing data output by the printing data outputting unit 42'. FIG. 10 (a) is a format of printing data containing a character code of a specific code page. FIG. 10 (b) is a format of printing data containing a character code of Unicode.

When printing data contains a character code of the code page, the printing data outputting unit 42' outputs the printing data without an addition of a character code switching command for use by the mode selecting unit 52'to select one of the first print control unit 53 and the second print control unit 54.

When printing data contains a character code of Unicode, the printing data outputting unit 42' adds a Unicode enter command to the beginning of the printing data, and a Unicode cancel command to the end of the printing data. The combination of the commands constitute the character code switching command. The printing data outputting unit 42' sends printing data to the printer 200 with the commands respectively added to the beginning and the end of the printing data.

Addition of the character code switching command may be executed by the printing data generating unit 41. Such printing data as modified may be received by the printing data outputting unit 42' and then sent to the printer 200. The function of the printing data generating unit 41 is executed, for example, by the application installed in the host computer 101 or 102.

The mode selecting unit 52' determines whether the character code switching command (the Unicode enter command) is added to the beginning of the received printing data to accordingly select one of the first print control unit 53 and the second print control unit 54. Specifically, the first print control unit 53 is selected when the Unicode enter command is not added while the second print control unit 54 is selected when the Unicode enter command is added.

The second print control unit 54 executes printing in response to the Unicode enter command. Then the mode selecting unit 52' restores the first print control unit 53 upon detecting the Unicode cancel command added to the end of the printing data.

Figure 11:
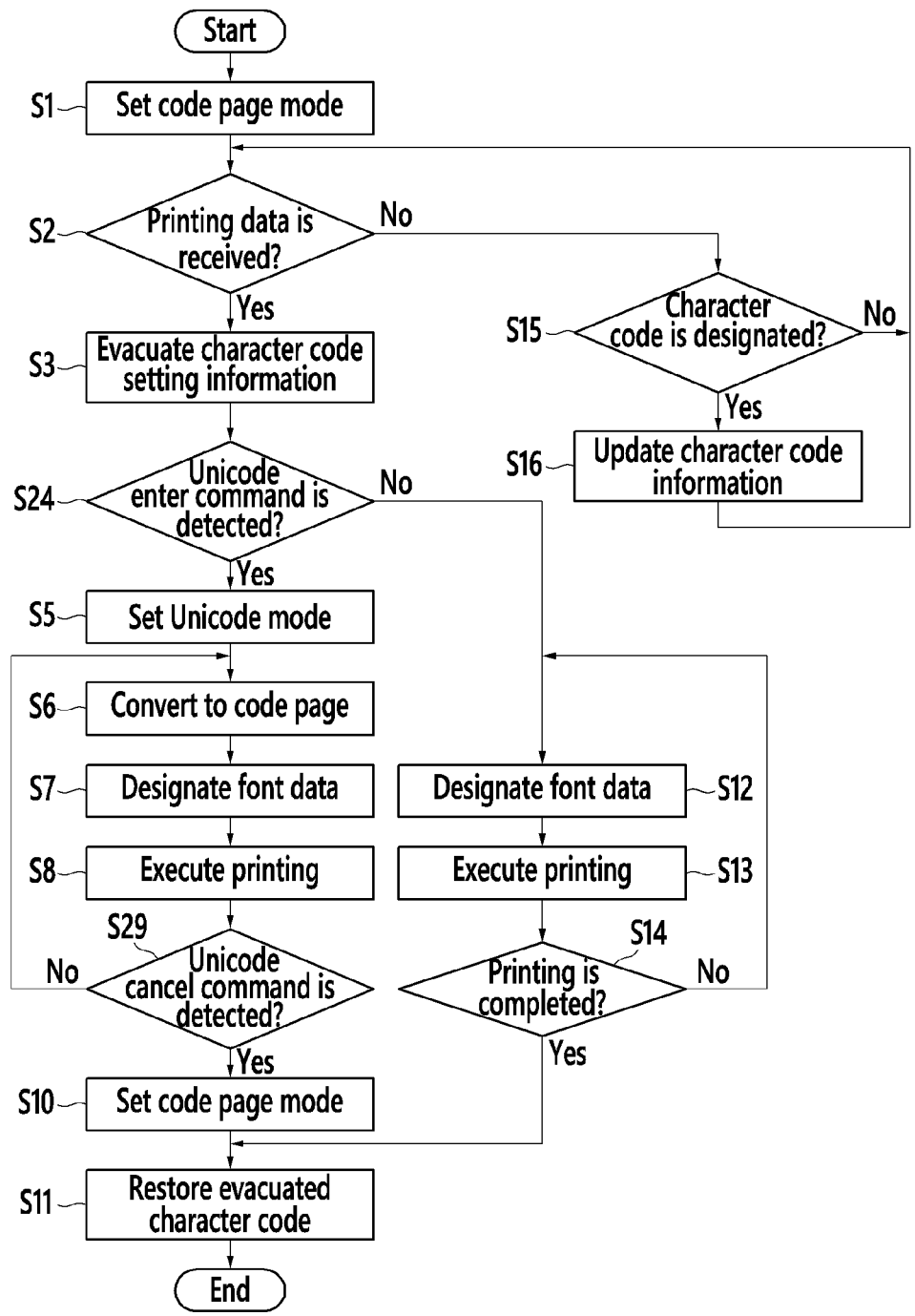
FIG. 11 is a flowchart of the operation of the printer in the second embodiment.

FIG. 11 is a flowchart of the operation of the printer 200 in the second embodiment. The flowchart starts when the printer 200 is powered on. Any step having the same symbol as FIG. 8 features the same function, the explanation of which is being omitted. The flowcharts are the same except Step S24 and Step S29.

In Step S24, the mode selecting unit 52' determines whether the Unicode enter command is added to the beginning of the received printing data to determine whether the printing data contains a character code of a specific code page or of Unicode. In Step S29, the mode selecting unit 52' determines whether the Unicode cancel command is added to the end of the received printing data. Upon detecting the Unicode cancel command, the mode selecting unit 52' restores the code page mode and the first print control unit 53 (Step S10).

The second embodiment enables more speedy and stable determination than the first embodiment where determination relies on a predetermined amount of data from the beginning of the printing data. In the case the amount of data to be examined is not enough, a character code of a specific code page contained around the beginning of the printing data happens to be wrongly determined as a character code of Unicode having the same format. Increasing the amount of data to be examined would eliminate a misjudgment but takes longer time for determination.

In the second embodiment where determination relies on the addition of the Unicode enter command, a small amount of data would be enough for determination, avoiding such misjudgment and enabling more speedy and stable determination.

(Third Embodiment)

The third embodiment of the invention is being described referring to the drawings. The entire configuration of the print system, the hardware configuration of either of the host computer 101 and the host computer 102, and the hardware configuration of the printer 200 are the same as those shown in FIG. 1 to FIG. 4.

Figure 12:
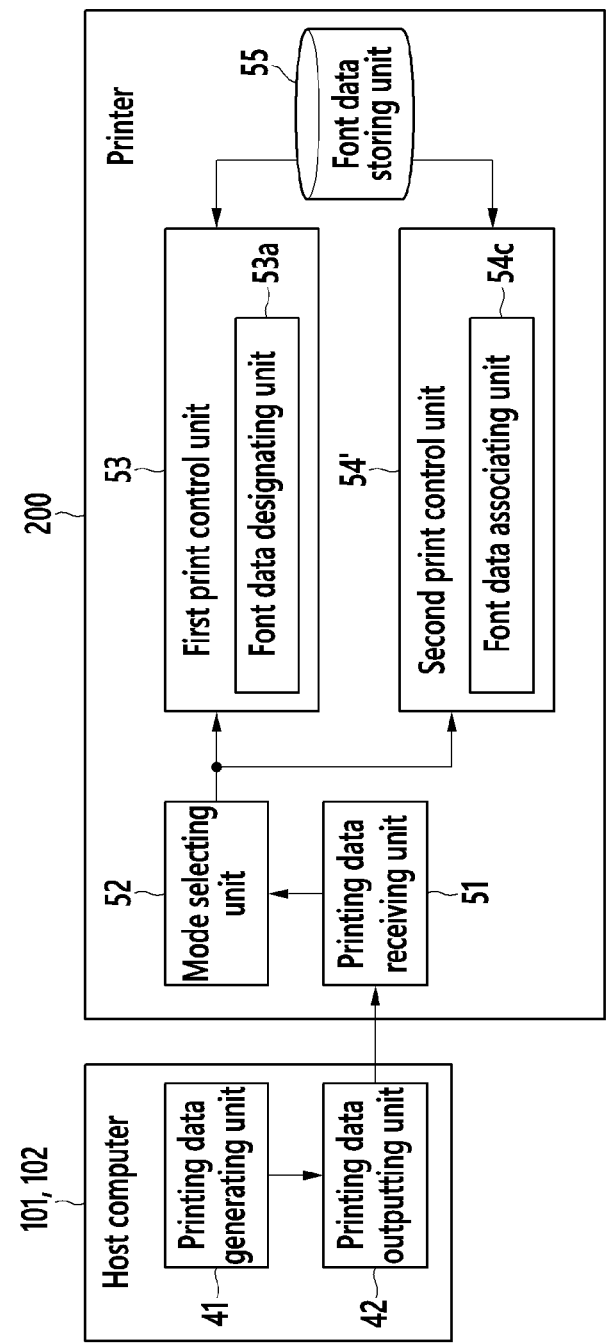
FIG. 12 is a block diagram of the functional configuration of the host computer and the printer of the third embodiment.

FIG. 12 is a block diagram of the functional configuration of the host computer 101 or 102 and the printer 200 of the third embodiment. Any element having the same symbol as FIG. 5 features the same function, the explanation of which is being omitted. The second print control unit 54 of the printer 200 is replaced by a second print control unit 54'.

The second print control unit 54' comprises a font data associating unit 54c. The font data associating unit 54c associates a character code of Unicode received by the printing data receiving unit 51 with a font data of the corresponding character code of a predetermined code page (such as JIS code).

Without conversion of the character codes, printing is executed by using font data for the corresponding character code of the code page. For example, the character code "3042" of Unicode corresponds to the character code "2422" of JIS code in accordance with the conversion table in FIG. 7. The letter represented by the character code "3042" is printed by designating a font of the corresponding character code "2422" of JIS code on the basis of the character code of Unicode as is. The font data associating unit 54c associates the character code "3042" of Unicode with an address of the corresponding code data of JIS code. Such association is executed in accordance with the address conversion table.

It may be the case that a particular character code of Unicode does not exist in the code page and therefore a code page font for the particular character code does not exist. A font address of the character code of a box or some other substitute characters such as "•" may be set in the table to represent that there is no correspondence in the JIS code.

Upon receipt of printing data containing a character code of Unicode by the printing data receiving unit 51, the second print control unit 54' enables printing of the character string represented by Unicode by using the code page font on the basis of the association by the font data associating unit 54c. The second print control unit 54' prints the character string by using the font stored at the address associated by the font data associating unit 54c. As far as the corresponding character code of the code page exist, the letter represented by the character code is printed with a right font. A replacement letter such as "☐" and "•" will be printed in case of no corresponding character code.

Figure 13:
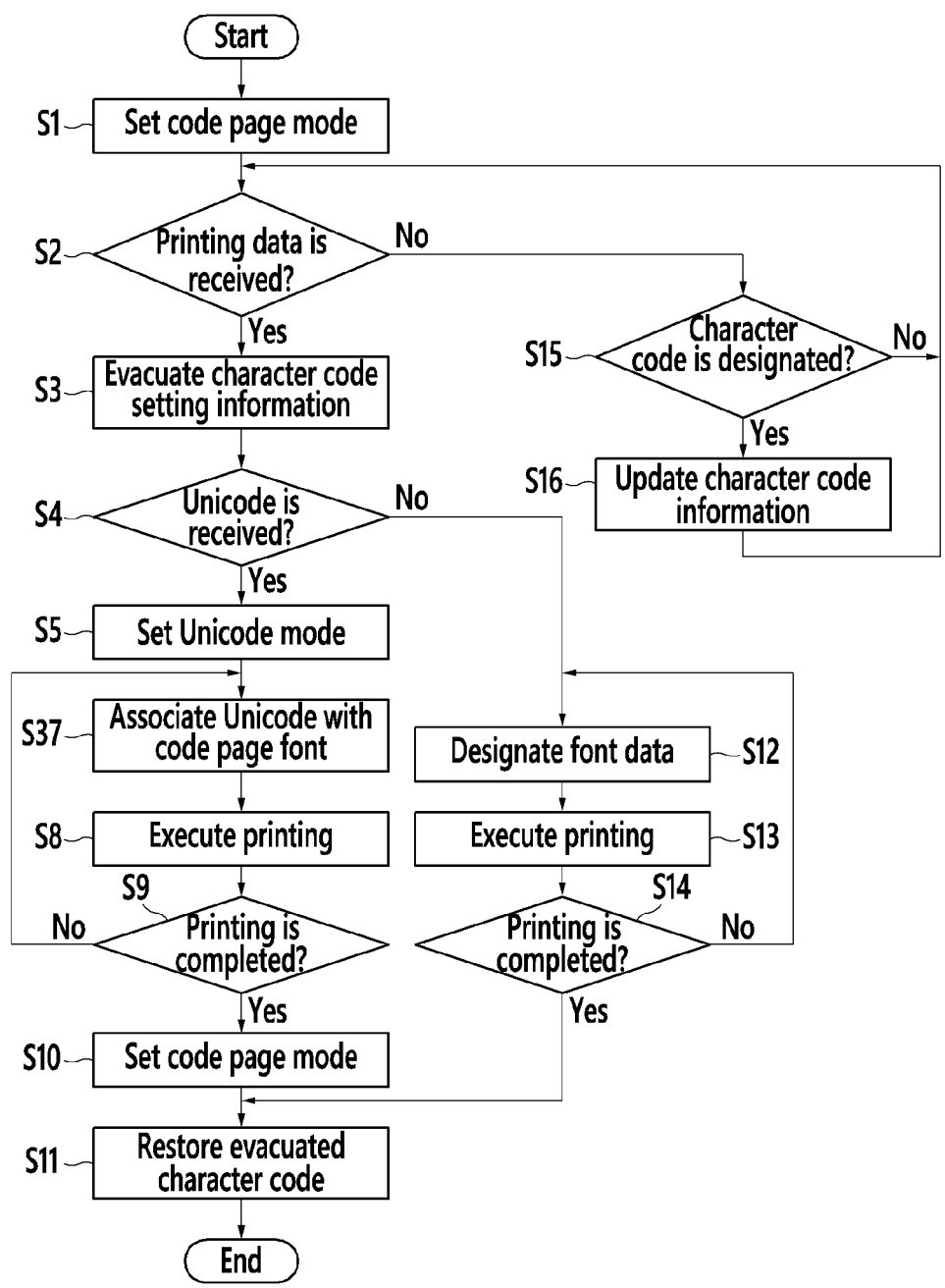
FIG. 13 is a flowchart of the operation of the printer in the third embodiment.

FIG. 13 is a flowchart of the operation of the printer 200 in the third embodiment. The flowchart starts when the printer 200 is powered on. Any step having the same symbol as FIG. 8 features the same function, the explanation of which is being omitted. Step S6 is excluded and S7 is replaced by S37.

In Step S37, the font data associating unit 54c associates a character code of Unicode received by the printing data receiving unit 51 with a font data of the corresponding character code of a predetermined code page in accordance with the address conversion table. In Step 8, upon receipt of printing data containing a character code of Unicode by the printing data receiving unit 51, the second print control unit 54' enables printing of the character string represented by Unicode by using the code page font on the basis of the association by the font data associating unit Mc.

The third embodiment has an advantage in that conversion of the character codes is eliminated, thereby improving the printing speed.

The first to third embodiments refers to the POS printer, but the invention is also applicable to printers of different types. The invention is most effective in the POS printer having a memory of smaller size insufficient for a large font set of Unicode. The invention is, however, similarly effective in other printers.

The default character code information 34a in the nonvolatile memory 34 may be either updated by the operating unit 37 of the printer 200 or by the operating unit 27 of either of the host computers 101 and 102

The second embodiment may be applied to the third embodiment. Specifically, the printing data outputting unit 42 and the mode selecting unit 52 may be respectively replaced by the printing data outputting unit 42' and the mode selecting unit 52'.

The default mode may be either the code page mode or the Unicode mode. The Unicode mode may be switched to the code page mode as required when printing is executed according to the received printing data.

In the first to third embodiments, the character code setting information 33a is evacuated as the character code evaluation information 33b when the print control units 53 and 54 are switched upon receipt of printing data. Instead, when the printer 200 is powered on, the default character code information 34a in the nonvolatile memory 34 may be stored in the RAM 33 not only as the character code setting information 33a and but the character code evacuation information 33b.

Further instead, the character code setting information 33a may be evacuated as the character code evacuation information 33b whether or not the print control units 53 and 54 are switched (the code page and the Unicode modes are switched) upon receipt of printing data. Accordingly, the character code setting information 33a may be always evacuated as the character code evacuation information 33b even when a specific code page mode is initially set and then a character code of another code page is received (for example, a character code of Shift JIS is received in the JIS code) or when a specific Unicode mode is initially set and then a character code of another Unicode is received (for example, a character code of UTF-16 is received in the UTF-8 mode).

The scope of the invention is not limited to the first to third embodiments. The invention may be embodied in various forms without departing from the scope of the invention.

What is claimed is:

1. A printer capable of receiving an input of printing data containing a character code of a character from a host computer and executing printing of a string on the basis of the input character code, comprising:
   a printing data receiving unit which receives an input of printing data containing either a first character code or a second character code, the first character code being a character code of a code page and the second character code being a character code of Unicode;
   a first print control unit which prints a content including the string represented by the code page with a font available for the code page upon receipt of the input of printing data containing the first character code by the printing data receiving unit;
   a second print control unit which prints a content including the string represented by the Unicode with the font available for the code page upon receipt of the input of printing data containing the second character code by the printing data receiving unit; and
   a mode selecting unit which selects one of the first print control unit and the second print control unit according to the character code contained in the input of printing data received by the printing data receiving unit,
   wherein the second print control unit comprises a font data associating unit which associates the character code of the Unicode with font data available for the code page without converting the character code of the Unicode to the character code of the code page, upon receipt of the input of printing data containing the second character code by the printing data receiving unit, and
   wherein the second control unit controls printing of the string represented by the Unicode with the font available for the code page on the basis of the association by the font data associating unit.

2. The printer of claim 1, wherein the printer is a point-of-sale printer.

3. The printer of claim 1, wherein the mode selecting unit evacuates character code setting information prior to execution of printing of the string on the basis of the input of printing data and restores the character code setting on the basis of the evacuated character code setting information after execution of printing of the string on the basis of the input of printing data.

4. The printer of claim 3, wherein the printer is a point-of-sale printer.

5. The printer of claim 1, wherein the mode selecting unit determines whether the input character code is either the first character code or the second character code by examining a predetermined amount of data from the beginning of the input of printing data received by the printing data receiving unit to select one of the first print control unit and the second print control unit.

6. The printer of claim 5, wherein the printer is a point-of-sale printer.

7. The printer of claim 3, wherein the mode selecting unit determines whether the input character code is either the first character code or the second character code by examining a predetermined amount of data from the beginning of the input of printing data received by the printing data receiving unit to select one of the first print control unit and the second print control unit.

8. The printer of claim 1, wherein the mode selecting unit determines whether a character code switching command is added to the beginning of the input of printing data received by the printing data receiving unit to select one of the first print control unit and the second print control unit.

9. The printer of claim 8, wherein the printer is a point-of-sale printer.

10. The printer of claim 3, wherein the mode selecting unit determines whether a character code switching command is added to the beginning of the input of printing data received by the printing data receiving unit to select one of the first print control unit and the second print control unit.

11. The printer of claim 1, wherein the font data associating unit which associates the character code of the Unicode with an address of a corresponding character code of the code page, the font data being stored at the address.

12. A printing system comprising a host computer and a printer capable of receiving an input of printing data from the host computer to execute printing:
the host computer comprising a printing data outputting unit which outputs printing data containing either a first character code or a second character code, the first character code being a character code of a code page and the second character code being a character code of Unicode; and
the printer comprising a printing data receiving unit which receives an input of printing data from the host computer;
a first print control unit which prints a content including a string represented by the code page with a font available for the code page upon receipt of the input of printing data containing the first character code by the printing data receiving unit;
a second print control unit which prints a content including a string represented by the Unicode with the font available for the code page upon receipt of the input of printing data containing the second character code by the printing data receiving unit; and
a mode selecting unit which selects one of the first print control unit and the second print control unit according to the character code contained in the input of printing data received by the printing data receiving unit;
wherein the mode selecting unit evacuates character code setting information prior to execution of printing of the string on the basis of the input of printing data and restores the character code setting on the basis of the evacuated character code setting information after execution of printing of the string on the basis of the input of printing data,
wherein the second print control unit comprises a font data associating unit which associates the character code of the Unicode with font data available for the code page without converting the character code of the Unicode to the character code of the code page, upon receipt of the input of printing data containing the second character code by the printing data receiving unit, and
wherein the second control unit controls printing of the string represented by the Unicode with the font available for the code page on the basis of the association by the font data associating unit.

13. The printing system of claim 12, wherein the printing data outputting unit of the host computer outputs printing data containing either the first character code or the second character code without addition of any dedicated information for determination by the mode selecting unit; and
wherein the mode selecting unit determines whether the input character code is either the first character code or the second character code by examining a predetermined amount of data from the beginning of the input of printing data received by the printing data receiving unit to select one of the first print control unit and the second print control unit.

14. The printing system of claim 12, wherein the printing data outputting unit of the host computer outputs printing data containing the second character code with an addition of a character code switching command to the beginning of the input of printing data; and
wherein the mode selecting unit determines whether the character code switching command is added to the beginning of the input of printing data received by the printing data receiving unit to select one of the first print control unit and the second print control unit.

15. The printing system of claim 12, wherein the font data associating unit which associates the character code of the Unicode with an address of a corresponding character code of the code page, the font data being stored at the address.

16. A print control method of a printer capable of receiving an input of printing data containing a character code of a character from a host computer to execute printing of a string on the basis of the input character code, the printer comprising a printing data receiving unit, a first print control unit, a second print control unit, and a mode selecting unit, comprising:
using the printing data receiving unit to receive the input of printing data containing either a first character code or a second character code, the first character code being a character code of a code page and the second character code being a character code of Unicode:
using the first print control unit to print a content including a string represented by the code page with a font available for the code page upon receipt of the input of printing data containing the first character code by the printing data receiving unit;
using the second print control unit to print a content including a string represented by the Unicode with the font available for the code page upon receipt of the input of printing data containing the second character code by the printing data receiving unit;
using the mode selecting unit to select one of the first print control unit and the second print control unit according to the character code contained in the input of printing data received by the printing data receiving unit;
using the mode selecting unit to evacuate character code setting information prior to execution of printing of the string on the basis of the input of printing data and restore the character code setting on the basis of the evacuated character code setting information after execution of printing of the string on the basis of the input of printing data:

using a font data associating unit included in the second print control unit to associate the character code of the Unicode with font data available for the code page without converting the character code of the Unicode to the character code of the code page, upon receipt of the input of printing data containing the second character code by the printing data receiving unit; and using the second control unit to control printing of the string represented by the Unicode with the font available for the code page on the basis of the association by the font data associating unit.

17. The print control method of claim 16, wherein the character code of the Unicode is associated with an address of a corresponding character code of the code page, the font data being stored at the address.

* * * * *